United States Patent
Schneider

[11] Patent Number: 5,988,151
[45] Date of Patent: Nov. 23, 1999

[54] METHOD FOR TANK VENTING IN AN INTERNAL COMBUSTION ENGINE

[75] Inventor: Stefan Schneider, Wenzenbach, Germany

[73] Assignee: Siemens Aktiengesellschaft, Munich, Germany

[21] Appl. No.: 08/998,004

[22] Filed: Jan. 16, 1998

[30] Foreign Application Priority Data

Jan. 16, 1997 [DE] Germany .......................... 197 01 353

[51] Int. Cl.⁶ .................................................. F02M 25/00
[52] U.S. Cl. .......................................... 123/698; 123/520
[58] Field of Search ...................... 123/698, 520

[56] References Cited

U.S. PATENT DOCUMENTS

| | | | |
|---|---|---|---|
| 5,299,546 | 4/1994 | Kato et al. | 123/698 |
| 5,406,927 | 4/1995 | Kato et al. | 123/698 |
| 5,469,833 | 11/1995 | Hara et al. | 123/698 |
| 5,520,160 | 5/1996 | Aota et al. | 123/698 |
| 5,546,917 | 8/1996 | Osanai et al. | |
| 5,553,595 | 9/1996 | Nishioka et al. | |
| 5,570,674 | 11/1996 | Izumiura et al. | 123/698 |
| 5,611,320 | 3/1997 | Hara et al. | 123/698 |
| 5,754,971 | 5/1998 | Matsumoto et al. | 123/698 |
| 5,791,321 | 8/1998 | Kondoh | 123/698 |
| 5,836,293 | 11/1998 | Osanai | 123/698 |

FOREIGN PATENT DOCUMENTS 38 13 220 A1 11/1989 Germany .

*Primary Examiner*—John Kwon
*Attorney, Agent, or Firm*—Herbert L. Lerner; Laurence A. Greenberg

[57] ABSTRACT

A Method for tank venting in an internal combustion engine includes ascertaining a degree of loading of an activated carbon filter. A desired flushing flow is calculated and a pulse duty factor for a tank venting valve is set depending on the level of the degree of loading and a predefined value for a maximum possible fuel mass flow through the tank venting valve. This is done as a function of the desired flushing flow, the temperature of a flushing stream and a pressure gradient at the tank venting valve, in such a way that the lambda deviation, brought about by a flushing procedure, of a lambda controller of the lambda control device, does not exceed a predefined maximum value.

16 Claims, 13 Drawing Sheets

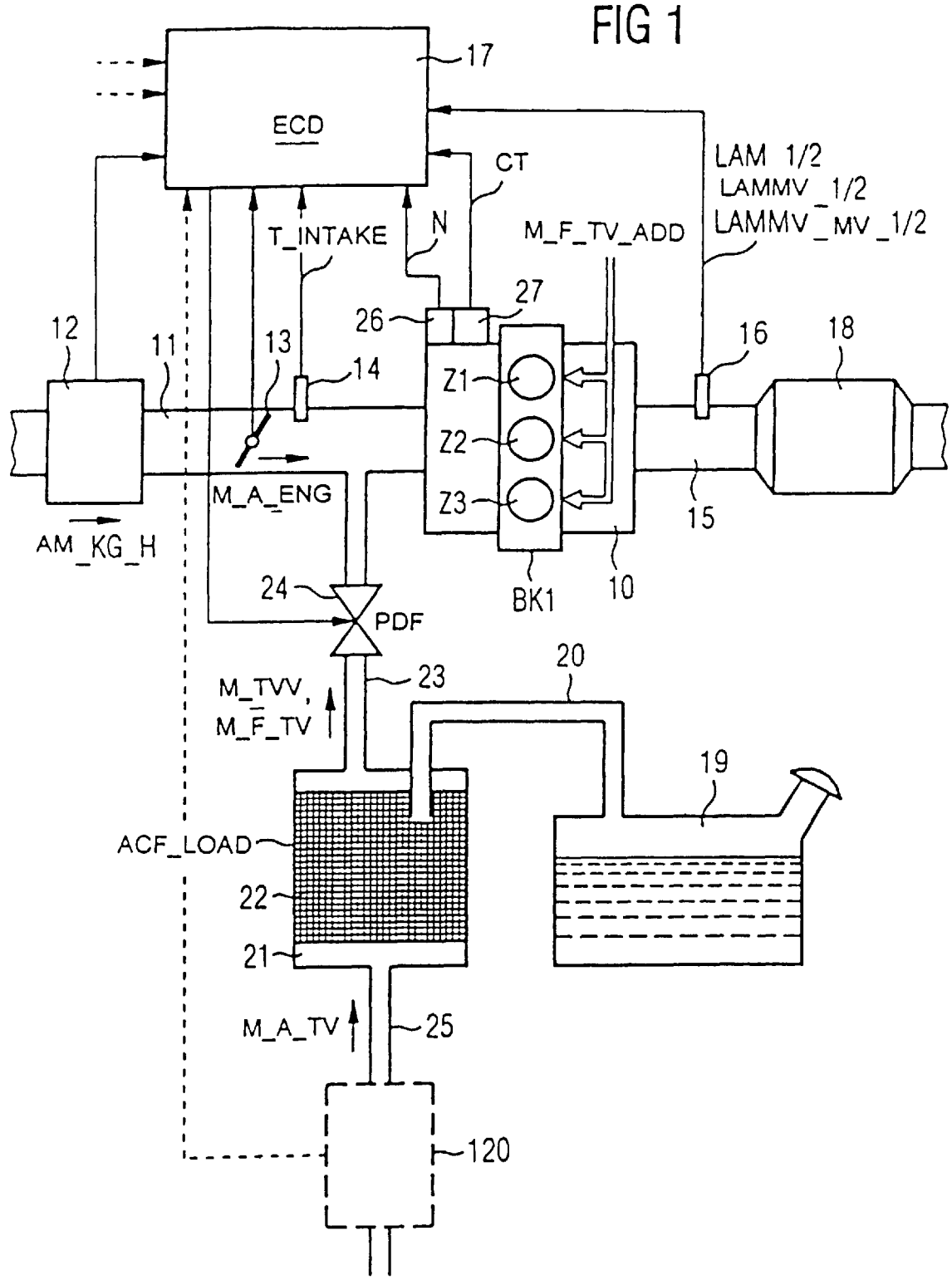

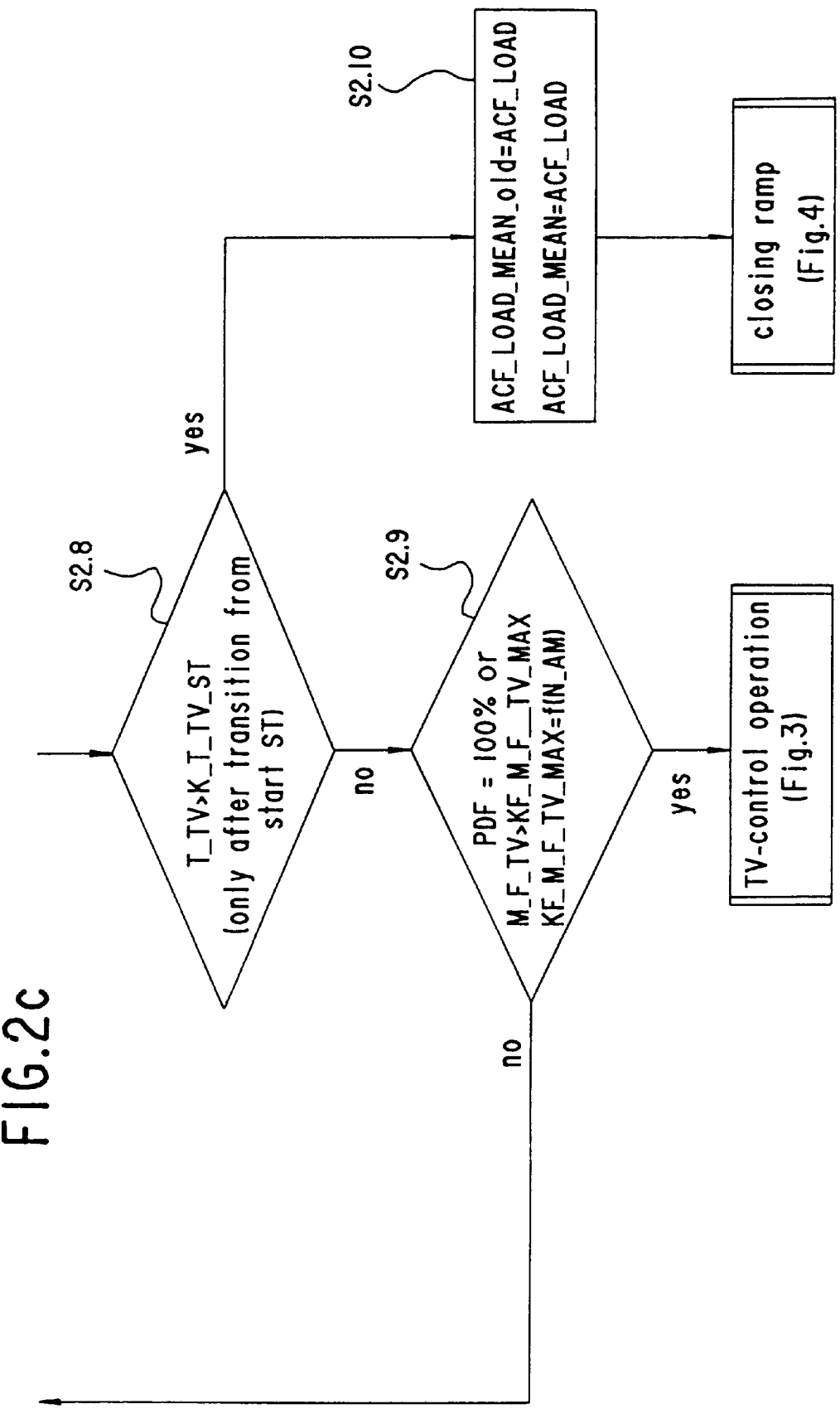

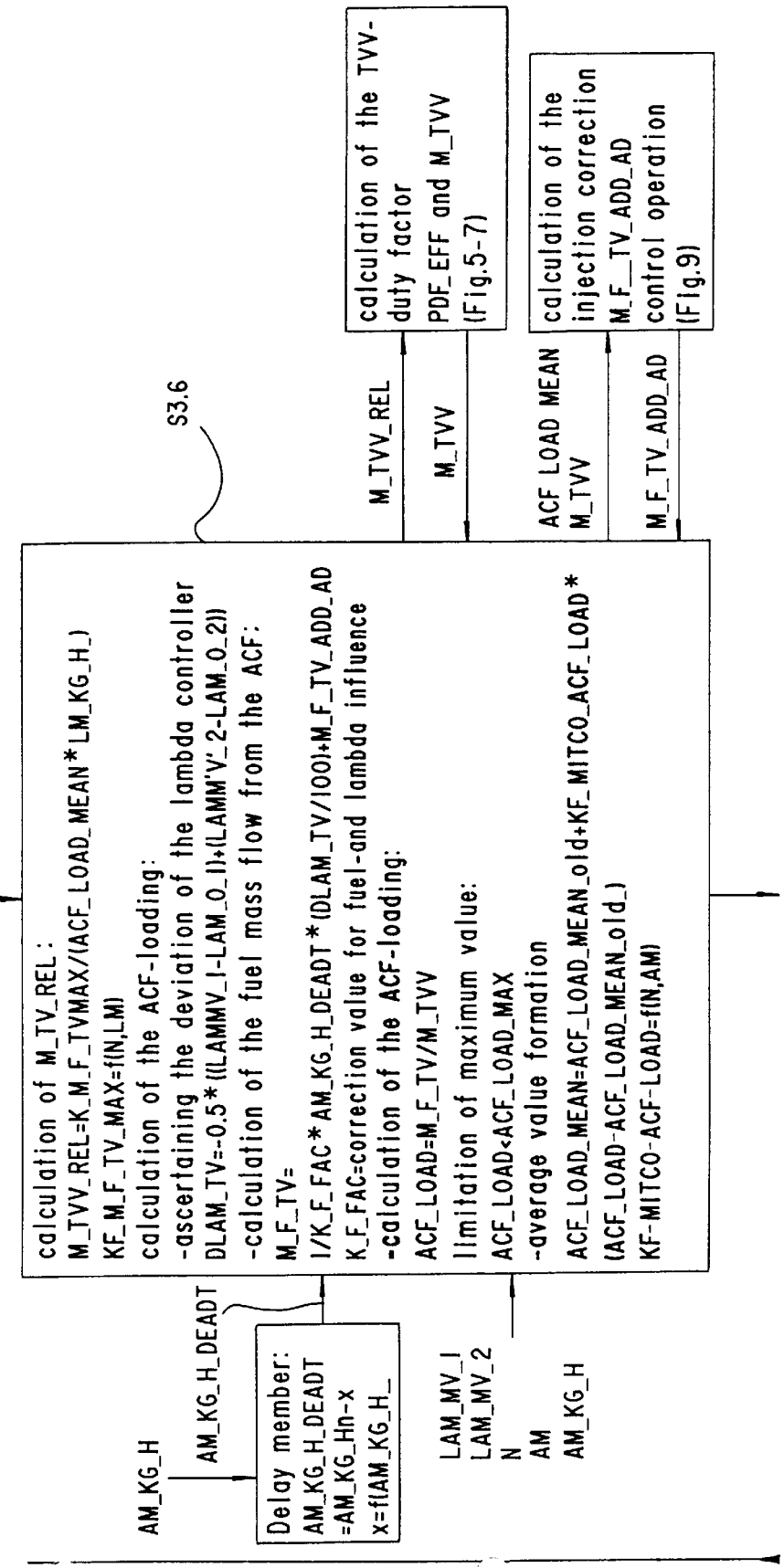

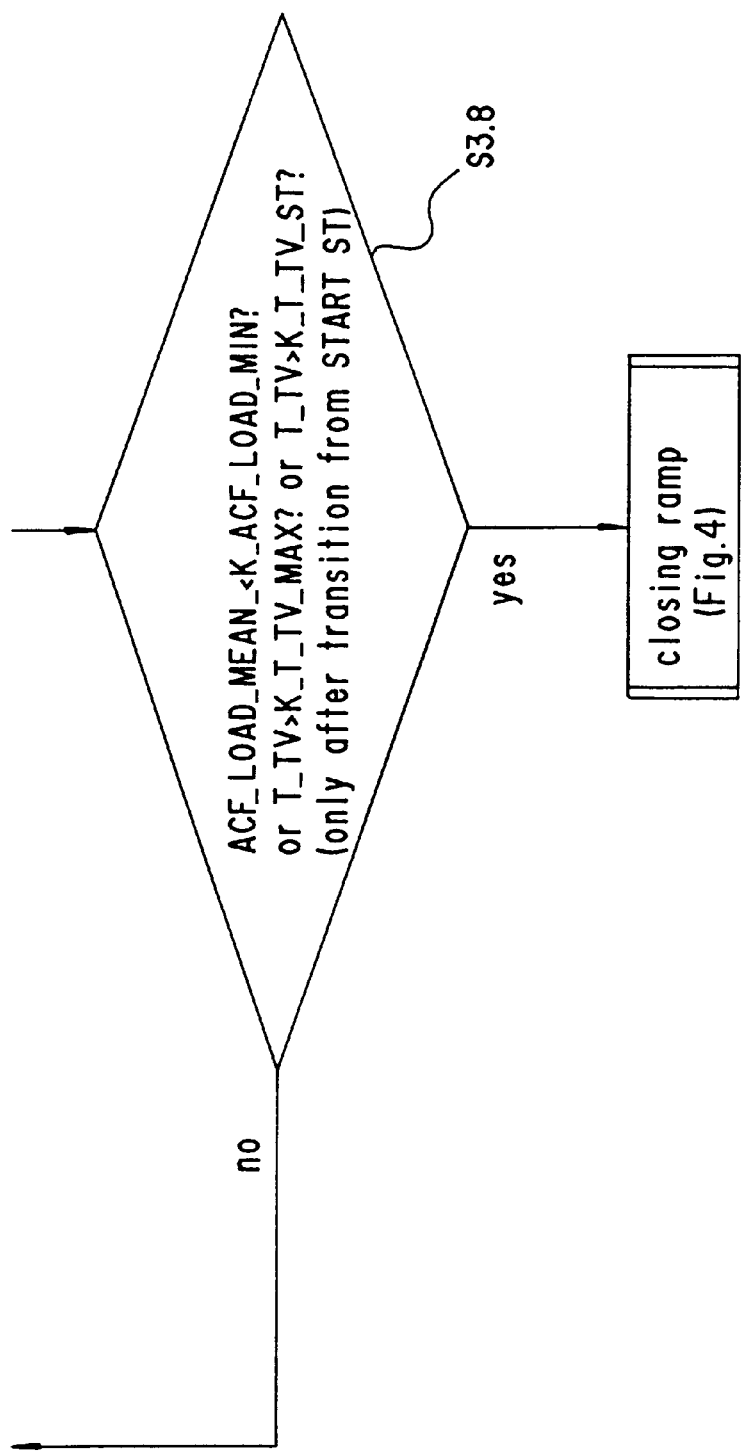

METHOD FOR TANK VENTING IN AN INTERNAL COMBUSTION ENGINE

BACKGROUND OF THE INVENTION

FIELD OF THE INVENTION

The invention relates to a method for tank venting in an internal combustion engine having a lambda control device for controlling an air/fuel mixture to be fed to the internal combustion engine, which includes intermediately storing fuel vapors arising in a fuel supply container in an adsorption container, preferably having an activated carbon filter, the activated carbon filter exhibiting a degree of loading dependent on the mass of fuel vapors adsorbed; initiating a flushing procedure of the activated carbon filter within the context of a regeneration phase, in selected operating regions of the internal combustion engine; continuously varying a passage cross section of a tank venting valve which is connected between the adsorption container and the internal combustion engine and can be driven by an electrical signal with a variable pulse duty factor; and introducing a flushing stream into the intake tract of the internal combustion engine, downstream of a throttle, for feeding to combustion.

The purpose of such tank venting installations, which are primarily used in motor vehicles, is to avoid the evaporation of hydrocarbons from the fuel tank into the atmosphere.

To that end, the tank venting installation generally has a fuel tank and a tank venting valve, which is connected to the intake tract of an internal combustion engine which drives the motor vehicle. As a result, with the aid of a negative pressure in the suction pipe, fuel vapors are sucked up and fed to the combustion in the cylinders of the internal combustion engine. It is normal for the volume located above the fuel in the fuel tank not to be sucked up directly, but for the fuel vapor to be intermediately stored in a separate container, which contains an adsorbent material, as a rule an activated carbon filter. That prevents the emergence of the fuel vapor into the environment. The activated carbon filter adsorbs fuel vapors in those periods in which no suction is being performed by the suction pipe, for example when the internal combustion engine is stopped or the tank venting valve is kept closed on the basis of the current operating state of the internal combustion engine.

Since the activated carbon filter can only store a limited fuel mass, it must be flushed in suitable operating ranges of the internal combustion engine. In that case, the tank venting valve, which is disposed in a line between the activated carbon filter and the suction pipe of the internal combustion engine, is opened by being driven through the use of suitable signals from an electronic control device of the internal combustion engine. The opening cross section of the tank venting valve and therefore the flushing stream of the activated carbon filter can be set through the use of a variation of the driving pulse duty factor of that signal.

However, the flushing rate cannot be selected to be arbitrarily high, since otherwise the lambda controller of the lambda control device reaches a limit (controller stop), and a predefined air/fuel ratio can no longer be adjusted.

German Published, Non-Prosecuted Patent Application DE 38 13 220 A1, corresponding to U.S. Pat. No. 5,072,712, has disclosed a method and a device for setting a tank venting valve. In order to obtain actuating values for driving the tank venting valve, which is connected to the intake connection of an internal combustion engine, use is made of a control factor which is supplied by a lambda controller calculation step. The control factor modifies a charging factor until a regeneration fuel quantity which leads to no deviation from the lambda desired value is discharged through the tank venting valve. The controlled charging factor modifies pilot control values for the regeneration fuel quantity which may be supplied in the case of an operating state that is present at that time. The maximum possible gas stream through the tank venting valve is calculated as a function of the pressure relationships at the tank venting valve that prevail in the case of the respective operating state. The device contains a flow determining device to take into account the pressure relationships at the tank venting valve, and a charging control device to adapt a provisionally assumed charging factor to the charging factor which is actually present.

SUMMARY OF THE INVENTION

It is accordingly an object of the invention to provide a method for tank venting in an internal combustion engine, which overcomes the hereinafore-mentioned disadvantages of the heretofore-known methods of this general type and with which a flushing rate of an activated carbon container can be increased without in so doing having to tolerate losses in terms of driveability of a vehicle or an increase in emissions in an exhaust gas.

With the foregoing and other objects in view there is provided, in accordance with the invention, a method for tank venting in an internal combustion engine having a lambda control device for controlling an air/fuel mixture to be fed to the internal combustion engine, the method which comprises intermediately storing fuel vapors arising from a fuel supply container in an adsorption container having an activated carbon filter; loading the activated carbon filter to a degree dependent on a mass of adsorbed fuel vapors; initiating a flushing procedure of the activated carbon filter within the context of a regeneration phase, in selected operating regions of the internal combustion engine; continuously varying a passage cross section of a tank venting valve connected between the adsorption container and the internal combustion engine, driving the tank venting valve with an electrical signal having a variable pulse duty factor, introducing a flushing stream into an intake tract of the internal combustion engine downstream of a throttle and feeding the flushing stream for combustion; ascertaining the degree of loading of the activated carbon filter and calculating a desired flushing flow in dependence on a level of the degree of loading and a predefined value for a maximum possible fuel mass flow through the tank venting valve; and setting a pulse duty factor for the tank venting valve as a function of the desired flushing flow, a temperature of a flushing stream and a pressure gradient at the tank venting valve, for preventing a lambda deviation brought about by a flushing procedure, of a lambda controller of the lambda control device, from exceeding a predefined maximum value.

In accordance with another mode of the invention, there is provided a method which comprises calculating the degree of loading ACF_LOAD of the activated carbon filter from the air mass flow $M_A\_TV$ through the activated carbon filter, the air mass flow $M\_A\_ENG$ through the throttle and the relative deviation of the lambda controller LAM_TV due to the tank venting, in accordance with the following relationship:

$$ACG\_LOAD = \frac{M\_A\_TV + M\_A\_ENG*(LAM\_TV)}{M\_A\_TV*(1+A_{ST})+M\_A\_ENG*(LAM\_TV)}$$

wherein $A_{st}$ is the stoichiometric air requirement.

In accordance with a further mode of the invention, there is provided a method which comprises measuring the air mass flow through the activated carbon filter with an air mass flow meter disposed at an aeration line of the activated carbon container, and measuring the air mass flow through the throttle with an air mass flow meter disposed in the intake tract of the internal combustion engine.

In accordance with an added mode of the invention, there is provided a method which comprises calculating the degree of loading ACF_LOAD of the activated carbon filter in accordance with the following relationship:

$$ACF\_LOAD = \frac{M\_A\_ENG * LAM\_TV}{A_{ST} * M\_TVV}$$

wherein M_A_ENG is the air mass flow through the throttle; LAM_TV is the relative deviation of the lambda controller; $A_{st}$ is the stoichiometric air requirement; and M_TVV is the mass flow through the tank venting valve in the case of an unloaded activated carbon filter; and fixing the values for the mass flow as a function of pressure relationships at the tank venting valve, air temperature in the intake tract and opening of the tank venting valve.

In accordance with an additional mode of the invention, there is provided a method which comprises calculating the desired flushing flow M_TVV_FLUSH through the tank venting valve in accordance with the following relationship:

$$M\_TVV\_FLUSH = \frac{M\_F\_TV\_MAX}{ACF\_LOAD}$$

wherein ACF_LOAD is the degree of loading of the activated carbon filter; and M_F_TV_MAX is the maximum permissible fuel mass flow through the tank venting valve.

In accordance with yet another mode of the invention, there is provided a method which comprises ascertaining an effective pulse duty factor from the pulse duty factor, performing a correction taking a battery voltage of a vehicle driven by the internal combustion engine into account, and performing a correction taking a nonlinearity of the characteristic curve of the tank venting valve into account.

In accordance with yet a further mode of the invention, there is provided a method which comprises calculating a relative mass flow M_TVV_REL through the tank venting valve from the desired flushing flow M_TVV_FLUSH in accordance with the following equation M_TVV_REL= M_TVV_FLUSH/AM_KG_H, wherein AM_KG_H is the air mass flow.

In accordance with yet an added mode of the invention, there is provided a method which comprises dividing a tank venting procedure into a plurality of phases running sequentially in time as follows incrementally increasing the relative mass flow in an opening ramp operation starting from a value zero until the fuel mass flow exceeds a limiting value; then calculating the relative mass flow in a control operation as a function of a maximum permissible fuel mass flow and a mean degree of loading; and decrementally reducing the relative mass flow in a closing ramp operation as far as the value zero.

In accordance with yet an additional mode of the invention, there is provided a method which comprises ascertaining the mean lambda controller deviation of the lambda controller during the opening ramp operation from predefined starting values, and additively correcting an injection quantity of fuel to be fed to the cylinders of the internal combustion engine by a value if the mean lambda controller deviation exceeds a limiting value and the injection quantity correction corresponds to the currently calculated fuel mass flow.

In accordance with again another mode of the invention, there is provided a method which comprises calculating the fuel mass flow out of the tank venting and the degree of loading from the mean lambda controller deviation and the additive correction, during the opening ramp operation.

In accordance with again a further mode of the invention, there is provided a method which comprises calculating the fuel mass flow M_F_TV in accordance with the relationship M_F_TV=1/K_F_FAC*AM_KG_H_DEAD* (DLAM_TV/100)+M_F_TV_ADD_AD, wherein K_F_FAC is a constant taking the influence of the fuel into account; AM_KG_H_DEADT is a factor taking a compensation for an offset in time between the acquisition of the air mass flow meter signal and of the lambda probe signal into account; DLAM_TV is the mean lambda controller deviation; and M_F_TV_ADD_AD is the additive correction.

In accordance with again an additional mode of the invention, there is provided a method which comprises calculating the degree of loading ACF_LOAD in accordance with the relationship ACF_LOAD=M_F_TV/M_TVV, wherein M_F_TV is the fuel mass flow; and M_TVV is the mass flow through the tank venting valve.

In accordance with still another mode of the invention, there is provided a method which comprises limiting the value for the degree of loading to a maximum value in order to avoid implausible values.

In accordance with still a further mode of the invention, there is provided a method which comprises carrying out the control operation until the mean degree of loading falls below a predefined threshold value or a time since a starting of a tank venting procedure exceeds a predefined value.

In accordance with a concomitant mode of the invention, there is provided a method which comprises making an additive correction M_F_TV_ADD_AD to the fuel injection quantity during control operation and during the closing ramp operation, and forming the correction from the averaged degree of loading ACF_LOAD_MEAN and the current mass flow M_TVV through the tank venting valve as follows M_F_TV_ADD_AD=ACF_LOAD_MEAN * M_TVV.

The use of the method according to the invention makes it possible to increase the flushing rate of the activated carbon container up to a limiting value, with the limiting value being predefined by the maximum permissible fuel mass flow from the tank venting. As a result, the activated carbon container can be flushed and therefore regenerated in a relatively short time.

Other features which are considered as characteristic for the invention are set forth in the appended claims.

Although the invention is illustrated and described herein as embodied in a method for tank venting in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and diagrammatic illustration of a tank venting installation for an internal combustion engine;

FIGS. 2a, 2b and 2c together illustrate a flow diagram for an "opening ramp operation" phase within normal operation;

FIGS. 3a, 3b and 3c together illustrate a flow diagram for the "control operation" phase within normal operation;

DESCRIPTION OF THE PREFERRED EMBODIMENT

Figure 2A:
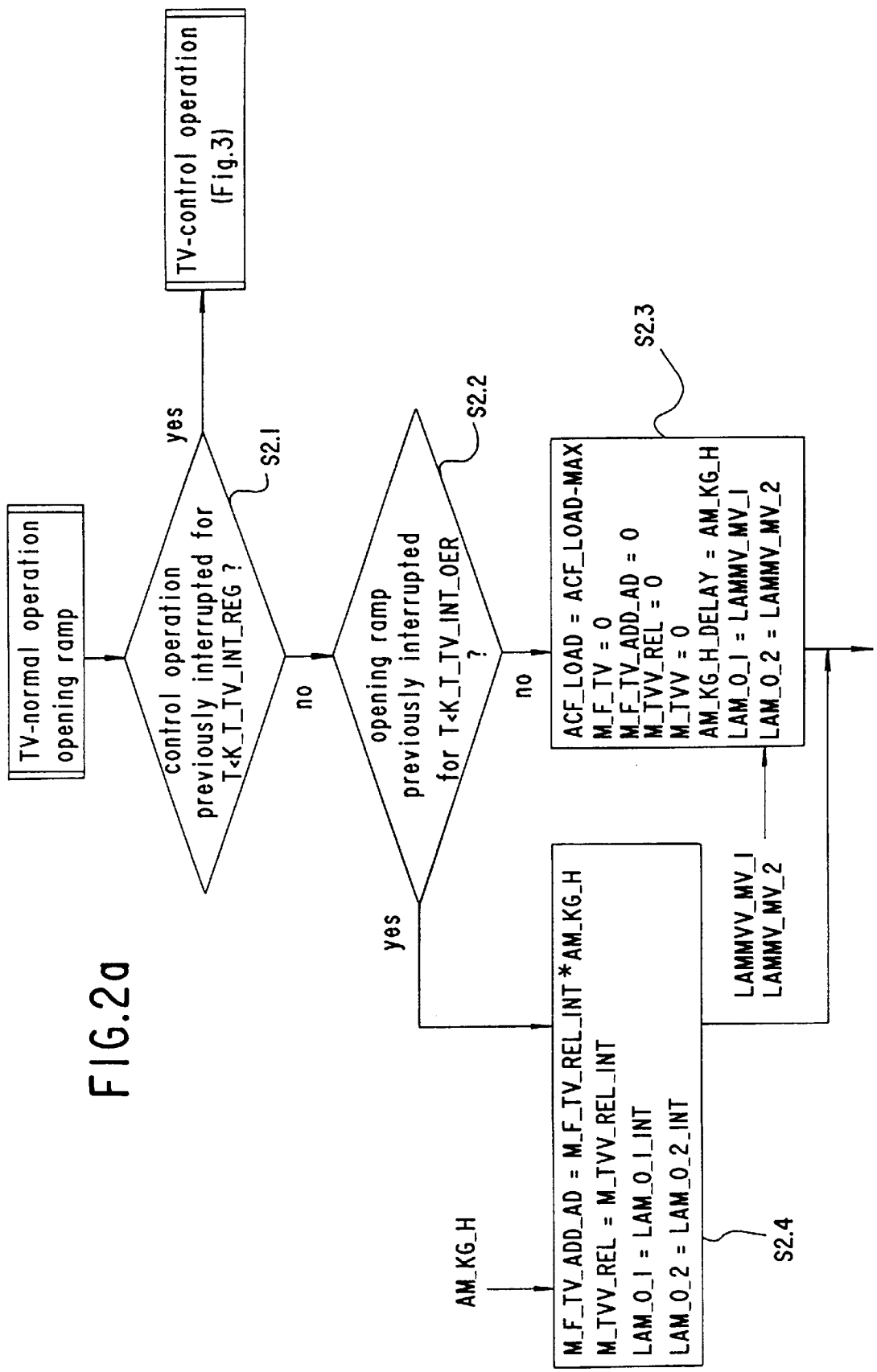

Referring now to the figures of the drawings in detail and first, particularly, to FIG. 1 thereof, there is seen a simplified form of a tank venting installation for a 6-cylinder internal combustion engine in a motor vehicle, in which only parts that are necessary for understanding the invention have been illustrated. In particular, a fuel metering device with injection valves and a fuel circuit that are necessary therefor are left out for reasons of clarity. The six cylinders of an internal combustion engine 10 are subdivided into two banks, to each of which an exhaust gas pipe each having a lambda probe and a catalytic converter is assigned. In FIG. 1, only one bank BK1 having cylinders Z1, Z2 and Z3 is illustrated.

An intake tract or tube 11 which is connected to an inlet side of the internal combustion engine 10 is provided with a load acquisition sensor in the form of an air mass meter 12, a throttle 13 having a non-illustrated sensor for a throttle position, and a sensor 14 for the temperature of the intake air, that are disposed one behind another as viewed in the flow direction of combustion air. An exhaust gas tract or tube 15 which is connected to an outlet side of the internal combustion engine 10 is provided with a lambda probe 16 which outputs a signal corresponding to an oxygen component in the exhaust gas of the cylinders Z1, Z2 and Z3 to an electronic control device (ECD) 17 of the internal combustion engine. A three-way catalytic converter 18 which is provided downstream of the lambda probe 16 serves to convert the polluting components $NO_x$, CO and HC contained in the exhaust gas.

A sensor 26 that is assigned to the crankshaft or the camshaft supplies a rotational speed signal N, and a temperature sensor 27 supplies a signal proportional to the temperature of the internal combustion engine, namely a coolant temperature CT, to the control device 17.

A fuel supply container 19 is connected through a venting line 20 to an adsorption container 21 which, for example, contains an activated carbon filter 22 for temporary storage of hydrocarbon vapors gassing out from the fuel supply container 19. A regeneration line 23 which leads away from the adsorption container 21 opens into the intake tract 11 of the internal combustion engine 10, downstream of the throttle 13. An electrically drivable flow control valve, which is referred to below as a tank venting valve 24, is disposed in the regeneration line 23. An aeration line 25 which is provided on the underside of the adsorption container 21, communicates with the atmosphere. The necessary flushing air is sucked through the aeration line 25 during a flushing procedure and the aeration line 25 can be shut off through the use of a non-illustrated electromagnetic valve during a checking routine relating to the tightness of the tank venting installation.

In addition to the output signals of the sensors mentioned above, the electronic control device 17 is supplied with further control parameters which are needed for the operation of the internal combustion engine. The control parameters are then further processed in such a way that, inter alia, the load state of the internal combustion engine is determined, the injection quantity or the injection time is calculated therefrom and, if required, flushing of the activated carbon container can be initiated.

In this case, depending on the degree of loading ACF_LOAD of the activated carbon filter 22, the flushing flow is set in such a way that a lambda deviation, which is brought about by the flushing of the activated carbon filter, does not exceed a predefined maximum value.

The basic function of the tank venting is composed of the following functional steps:

a) ascertaining the degree of loading;
b) calculating the desired flushing flow; and
c) calculating the driving pulse duty factor for the tank venting valve; and
d) calculating the injection quantity correction and calculating the injection time correction therefrom.

a) Ascertaining the degree of loading:

The degree of loading ACF_LOAD of the activated carbon filter 22 can be determined very precisely if the air mass flow M_A_TV, which flows into the activated carbon filter 22, is measured. To this end, an air mass meter 12 can be used, as is drawn with dashed lines in FIG. 1. The degree of loading can then be defined as a fuel mass flow out of the activated carbon filter 22, related to the actual mass flow through the tank venting valve 24. The actual mass flow through the tank venting valve 24 results from the sum of the air mass flow M_A_TV and a fuel mass flow M_F_TV out of the activated carbon filter 22. The definition for the degree of loading ACF_LOAD is $$ACF\_LOAD = \frac{M\_F\_TV}{M\_A\_TV + M\_F\_TV} \qquad (1)$$

wherein:

M_F_TV: Fuel mass flow through the tank venting valve
M_A_TV: Air mass flow through the activated carbon filter.

The degree of loading ACF_LOAD of the activated carbon filter 22, which is also merely referred to as loading for simplicity, can be determined as follows, in the case of internal combustion engines controlled at λ=1, from the measured air mass flows M_A_ENG, M_A_TV and the relative deviation of the lambda controller LAM_TV:

$$ACF\_LOAD = \frac{M\_A\_TV + M\_A\_ENG * (LAM\_TV)}{M\_A\_TV * (1 + A_{ST}) + M\_A\_ENG * (LAM\_TV)} \quad (2)$$

wherein
M_A_ENG: Air mass flow through the throttle
LAM_TV: Relative lambda deviation as a result of tank venting
$A_{st}$: Stoichiometric air requirement.

Since as a rule the use of an air mass meter 120 for the air mass flow M_A_TV flowing through the activated carbon filter 22 is omitted for reasons of cost, this value is not available, and Equation (2), which would allow an exact determination of the degree of loading ACF_LOAD, cannot be applied. A changed definition of the degree of loading is therefore used for the tank venting function described below:

$$ACF\_LOAD = \frac{M\_F\_TV}{M\_TVV} \quad (3)$$

wherein
M_TVV: Mass flow through the tank venting valve in the case of an unloaded activated carbon filter
M_F_TV: Fuel mass flow through the tank venting valve In this case, the mass flow M_TVV is not the actual mass flow through the tank venting valve 24, but rather the mass flow which would flow through the tank venting valve 24 in the case of an unloaded activated carbon filter 22, given otherwise identical boundary conditions, that is to say a pure air mass flow.

The value M_TVV is stored in a memory or store in the form of a characteristic map in the control device 17 of the internal combustion engine. When the activated carbon filter 22 is loaded and thus the flushing air also has fuel mixed with it, the air mass flow through the tank venting valve is smaller than the value stored in the characteristic map. A pressure gradient therefore prevails across the activated carbon filter 22, and is initially relatively low, that is to say, although given a constant pressure gradient and opening cross section of the tank venting valve 24, the volume flow remains constant, but when fuel is contained in the mass flow there is a higher mass flow, given the same volume flow, because of the density of the fuel vapor being higher by about a factor of 2 than air.

The degree of loading ACF_LOAD represents a measure of the fuel proportion in the flushing stream and can be ascertained as described above with the aid of Equation (3). The fuel mass flow through the tank venting valve 24 can be calculated from the deviation of the lambda controller and the air mass flow. From the general lambda equation:

$$\lambda = \frac{\dot{m}_A}{\dot{m}_F * A_{ST}} \quad (4)$$

wherein
$\dot{m}_A$: Air mass flow
$\dot{m}_F$: Fuel mass flow
$A_{st}$: Stoichiometric air requirement
$\lambda$: Air number
it is possible to derive the following equations for an internal combustion engine having lambda control and tank venting:

$$\dot{m}_A = M\_A\_ENG + M\_A\_TV \quad (5)$$

$$\dot{m}_F = M\_F\_ENG * (1 - LAM\_TV) + M\_F\_TV \quad (6)$$

If Equations (5) and (6) are substituted into Equation (4), then the following relationship is obtained for the air number $\lambda$:

$$\lambda = \frac{M\_A\_ENG + M\_A\_TV}{(M\_F\_ENG * (1 - LAM\_TV) + M\_F\_TV * A_{ST})} \quad (7)$$

wherein
M_A_ENG: Air mass flow through the throttle
M_A_TV: Air mass flow through the tank venting valve
M_F_ENG: Fuel mass flow through the injection valves without tank venting
M_F_TV: Fuel mass flow through the tank venting valve
LAM_TV: Relative lambda controller deviation as a result of the tank venting.

The air mass flow M_A_TV through the tank venting valve 24 can be neglected, since it is very small in comparison with the total air mass flow. By rearranging Equation (7), and with M_A_TV=0, one obtains:

$$\frac{1}{\lambda} = \frac{M\_F\_ENG * A_{ST}}{M\_A\_ENG} * (1 - LAM\_TV) + \frac{M\_F\_TV * A_{ST}}{M\_A\_ENG} \quad (8)$$

In the case of engines controlled with $\lambda=1$, the following applies both before as well as during the flushing of the activated carbon filter 22:

$$\lambda = 1 \text{ and}$$

$$\frac{M\_A\_ENG}{M\_F\_ENG * A_{ST}} = 1$$

This results in the following equation for the fuel mass flow M_F_TV through the tank venting valve 24:

$$M\_F\_TV = 1/A_{st} * M\_A\_ENG * LAM\_TV \quad (9)$$

If this expression for the fuel mass flow is substituted into Equation (3), then the following relationship results for the degree of loading ACF_LOAD of the activated carbon filter 22:

$$ACF\_LOAD = \frac{M\_A\_ENG * LAM\_TV}{A_{ST} * M\_TVV} \quad (10)$$

The mass flow M_TVV through the tank venting valve 24 depends on the pressure gradient across the tank venting valve, the temperature of the intake air T_INTAKE and the opening cross section of the tank venting valve. The mass flow M_TVV is not the actual mass flow through the tank venting valve, but rather the mass flow which flows through the tank venting valve 24 in the case of an unloaded activated carbon filter 22 and given otherwise identical boundary conditions. Since the density of the fuel vapor is higher than that of air, the actual mass flow through the tank venting valve 24 in the case of a loaded activated carbon filter 22 is greater than the value M_TVV. Since the reference variable is not the actual mass flow during the calculation of the activated carbon filter loading ACF_LOAD according to Equation (3), as in the case of the exact calculation according to Equation (2), but is based on the theoretical air mass flow, the result in this case is a density error. Due to the selected simplification (Equation (3)), this density error leads to the fact that the activated carbon filter loading ACF_LOAD can assume values between 0 and 2.

The temperature of the intake air T_INTAKE is acquired by the temperature sensor 14 that is disposed in the intake tract 11, downstream of the throttle 13. As an alternative to this, the temperature sensor can also be installed in the air mass meter. The pressure gradient at the activated carbon filter 22 can be determined either through a characteristic map, in which values for the pressure are stored for steady-state operating points of the internal combustion engine or, in the case of engine control managed by suction-pipe pressure, it can be accomplished with the aid of a suction-pipe pressure sensor that is present in any case. However, the pressure gradient can also be calculated from calculated values of the suction-pipe pressure and the ambient pressure through the use of modeling for the suction pipe.

The calculation of the degree of loading ACF_LOAD and of the fuel mass flow M_F_TV is performed continuously during the entire flushing phase.

b) Calculating the desired flushing flow:

The desired flushing flow through the tank venting valve 24 is set in such a way that a fuel mass flow, which is a maximum as predefined by the characteristic map, is established through the tank venting valve 24. The values for the maximum fuel mass flow M_F_TV_MAX through the tank venting valve are stored in a characteristic map as a function of load and rotational speed. The levels of the values are determined by emission limiting values and/or by driveability conditions. In this case, the flushing flow depends directly on the degree of loading ACF_LOAD of the activated carbon filter 22. In the case of a known degree of loading ACF_LOAD (Equation (10)), the desired flushing flow can be calculated in accordance with the following equation:

$$M\_TVV\_FLUSH = \frac{M\_F\_TV\_MAX}{ACF\_LOAD} \quad (11)$$

wherein
M_TVV_FLUSH: Desired flushing flow through the tank venting valve
M_F_TV_MAX: Maximum permissible fuel mass flow through the tank venting valve According to the definition of the degree of loading ACF_LOAD in accordance with Equation (3), the desired flushing flow M_TVV_FLUSH is a mass flow that is normalized to the air density. The desired flushing flow is continuously set as a function of the respective degree of loading ACF_LOAD of the activated carbon filter 22. This makes it possible to achieve a high degree of flushing, since the flushing flow increases with decreasing degree of loading ACF_LOAD.

c) Calculating the driving pulse duty factor for the tank venting valve:

The tank venting valve 24 is opened through the driving pulse duty factor PDF_EFF, given a constant driving frequency. The required pulse duty factor depends on the desired flushing flow, the temperature of the flushing stream and the pressure gradient across the tank venting valve 24. The following applies:

$$PDF\_EFF = f(\Delta p, T\_TVV, M\_TVV\_FLUSH) \quad (12)$$

wherein
PDF_EFF: Effective driving pulse duty factor for the tank venting valve
$\Delta p$: Pressure gradient across the tank venting valve
T_TVV: Temperature of the flushing stream
M_TVV_FLUSH: Desired flushing flow through the tank venting valve A description of these relationships in terms of formulae (Equation 12) is very complicated. For this reason, the calculation of the driving pulse duty factor is performed through empirically ascertained characteristic maps as a function of the desired flushing flow, suction-pipe pressure, ambient pressure and intake air temperature. As long as the tank venting valve 24 is not completely opened, it is true that:

$$M\_TVV = M\_TVV\_FLUSH \quad (13)$$

that is to say, the actual mass flow (flushing flow) through the tank venting valve is equal to the required mass flow M_TVV_FLUSH.

If the tank venting valve 24 is completely open, it may occur that the required flushing flow is higher than the actual flushing flow. In order to calculate the degree of loading ACF_LOAD, the value M_TVV has to be ascertained through empirically ascertained characteristic curves as a function of suction-pipe pressure, ambient pressure and intake air temperature.

d) Calculating the injection quantity correction:

In the case of a known degree of loading ACF_LOAD (Equation (10)) and known flushing flow through the tank venting valve 24, it is possible for the fuel mass flow to be calculated from the tank venting, from Equation (3) which calculates the loading of the activated carbon filter 22:

$$M\_F\_TV = ACF\_LOAD * M\_TVV \quad (3A)$$

An additive correction to the injection quantity M_F_TV_ADD_AD can be calculated therefrom, in order to avoid an excessively severe deviation of the lambda values during tank venting. The sequence of the tank venting function is explained in more detail using FIGS. 2–10. In this case, the tank venting function is subdivided into the following partial functions:

Tank venting valve closed (designated in simple form below as TVV_SHUT): no flushing operation is performed.

MIN operation: flushing operation in the case of an unknown degree of loading of the activated carbon filter.

Normal operation: flushing operation depending on the degree of loading of the activated carbon filter. Normal operation includes the phases: opening ramp operation, control operation and closing ramp operation.

Figure 10A:
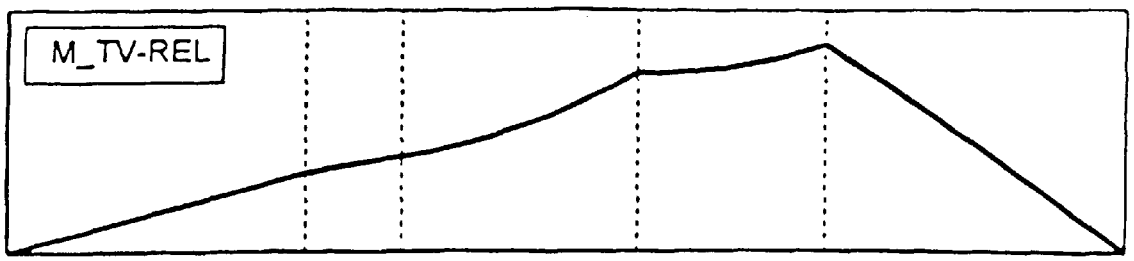
FIGS. 10a–10f are graphs illustrating an example of a sequence of a tank venting function for normal operation, with reference to time profiles of selected variables.
Figure 10B:
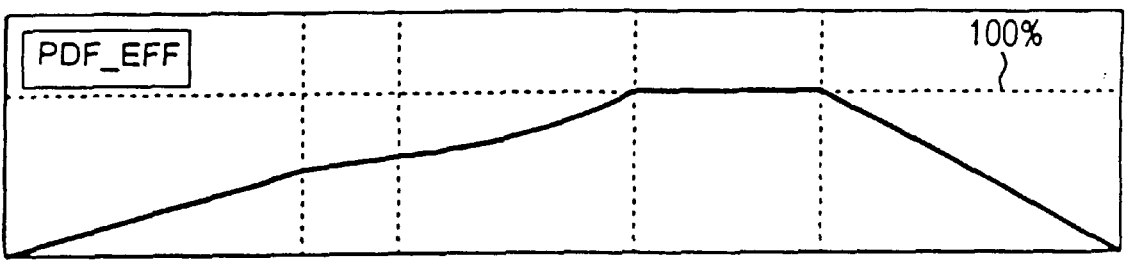
Figure 10C:
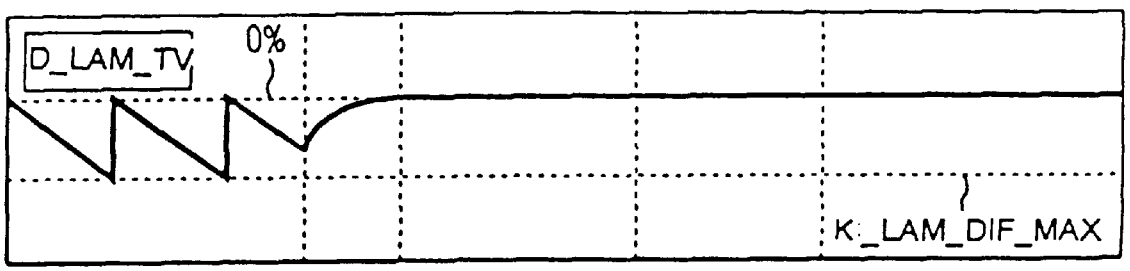
Figure 10D:
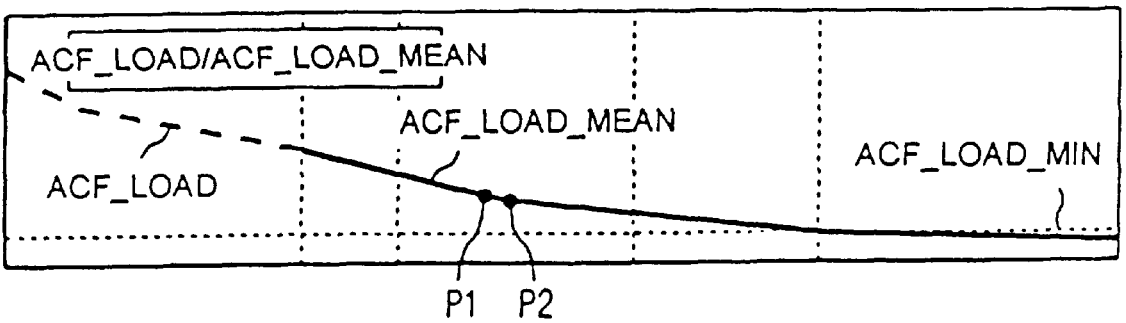
Figure 10E:
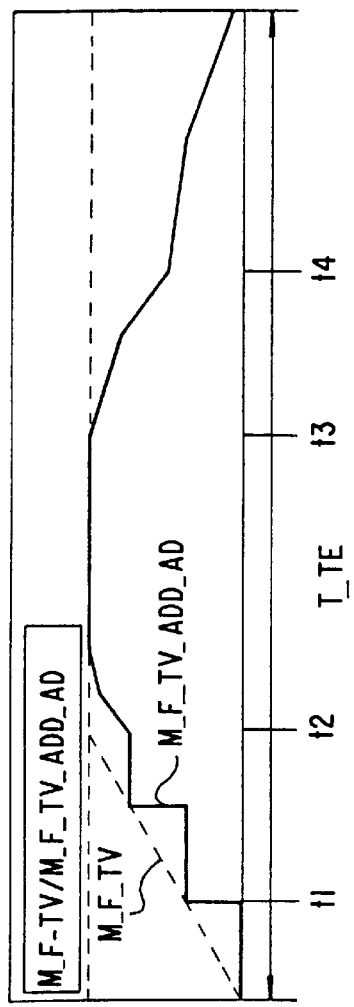
Figure 10F:
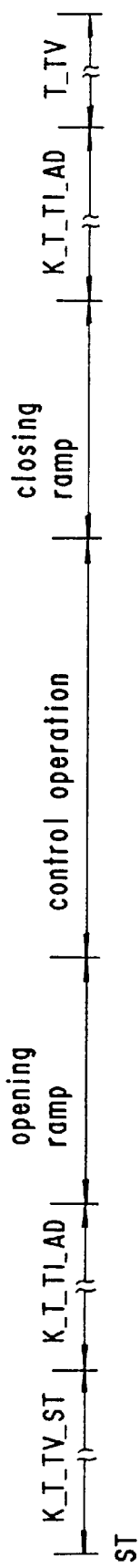

An engine run is subdivided into 3 time regions (FIG. 10f). A time region K_T_TV_ST is started with a transition from a start ST. After this region has elapsed, time regions K_T_TI_AD and T_TV alternate. The time T_TV is variable (compare normal operation partial function) and limited to a maximum value T_TV<K_T_TV_MAX. In the time regions K_T_TV_ST and T_TV the tank venting function proceeds. The decision as to which partial function of the tank venting proceeds in the time region K_T_TV_ST or T_TV depends on which of the following conditions for the activated carbon filter flushing are satisfied. The lambda adaptation is performed in the time region K_T_TI_AD.

No flushing operation is performed, and the tank venting valve 24 remains closed if one of the following conditions (conditions TVV_SHUT) is satisfied:

the internal combustion engine is in the operating state: engine stationary, start or restart, the coolant temperature CT lies below a predefined limiting value CT_MIN_TV, cylinder switch-off is active, the time region K_T_TI_AD for lambda adaptation is running, a lambda controller is at the control limit for longer than a predefined time, there is a diagnostic error for the tank venting valve.

The flushing operation in the case of an unknown degree of loading of the activated carbon filter (MIN operation) is executed if:

none of the conditions for TVV_SHUT is satisfied and there is a variant in which the internal combustion engine does not have any lambda control device, although it is equipped with a tank venting installation, or there is a diagnostic error of the components necessary for the tank venting function and lambda control (air mass flow meter, temperature sensors, throttle, idle-running filling positioner, lambda probe, ignition device, injection etc.).

Since normal operation is subdivided into the three partial functions: opening ramp, control operation and closing ramp, a check is made for each individual partial function as to whether or not certain conditions are satisfied.

The opening ramp partial function is executed if:

none of the conditions for TVV_SHUT is satisfied and none of the conditions for MIN operation is satisfied, both lambda controllers are controlling unrestrictedly, limited dynamics for the rotational speed and the air mass are satisfied, the rotational speed lies between two limiting values N_TV_L<N<N_TV_U and the air mass lies between two limiting values AM_TV_L<AM<AM_TV_U.

The last three conditions characterize a quasi-steady state of the internal combustion engine.

The control operation partial function is executed if:

none of the conditions for TVV_SHUT is satisfied and also none of the conditions for MIN operation is satisfied and both lambda controllers are controlling unrestrictedly.

The conditions for the execution of the closing ramp partial function are:

cylinder switch-off is not active and both lambda controllers are controlling unrestrictedly.

Normal operation always proceeds in the following order:

opening ramp →control operation →closing ramp.

At the beginning of normal operation, the tank venting valve 24 is closed. If the transition into normal operation is performed from MIN operation, then the MIN operation is ended and the tank venting valve 24 is closed for a time T=K_T_TV_DELAY that can be applied in a fixed manner. The input variable for the calculation of the driving pulse duty factor for the tank venting valve 24, namely the mass flow through the tank venting valve M_TVV_REL, related to the air mass, is set to zero. This serves to obtain a defined initial value for the lambda controller installation.

Figure 2B:
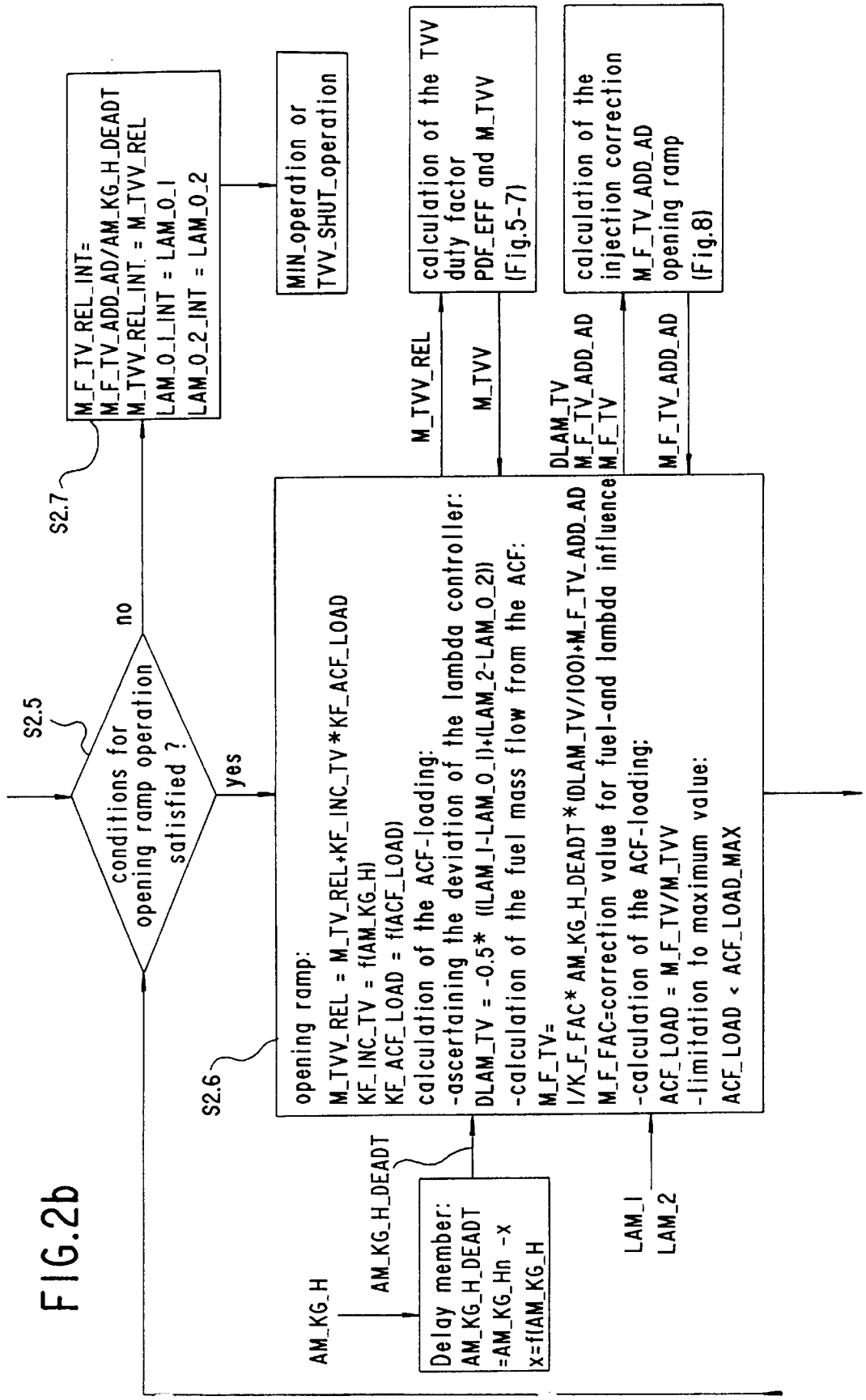

The flow diagram for the "opening ramp" phase of normal operation is illustrated in FIG. 2.

Since the degree of loading of the activated carbon filter 22 is not known at the beginning of tank venting, the tank venting valve 24 is opened slowly through a ramp at the start. This is intended to avoid excessively high lambda deviations.

At the beginning of the opening ramp, in a method step S2.1, a check is made as to whether or not the control operation has been interrupted for a time T<K_T_TV_INT_REG. If this is the case, control operation (FIG. 3) is continued, that is to say if the tank venting function was in control operation (for example time P1 in FIG. 10d), and this operation had been left for a short time (as far as time P2 in FIG. 10d), it is thus assumed that during this brief time T<K_T_TV_INT_REG between the times P1 and P2 (typically a few seconds), the degree of loading ACF_LOAD of the activated carbon filter 22 has not changed significantly. This is permissible since the procedure of discharging the activated carbon filter 22 proceeds relatively slowly. In the case of such a brief interruption, when the operation is initiated once more, recourse is therefore always made to those values which were present before the interruption.

If the control operation has not been interrupted, then a query is raised in a method step S2.2 as to whether or not the opening ramp operation had previously been interrupted for a time T<K_T_TV_INT_OER. If no interruption has taken place, or the time following the interruption was T>K_T_TV_INT_REG or T>K_T_TV_INT_OER, then the following starting or initial values are set in a method step S2.3:

| | |
|---|---|
| ACF_LOAD=ACF_LOAD_MAX | Loading of the activated carbon filter |
| M_F_TV=0 | Fuel mass flow out of the tank venting |
| M_F_TV_ADD_AD=0 | Additive adaptation of the injection quantity |
| M_TVV_REL=0 | Relative mass flow through the tank venting valve |
| M_TVV=0 | Mass flow through the tank venting valve |
| AM_KG_H_DELAY=0 | Delayed air mass flow AM_KG_H |
| LAM_0_1=LAMMV_MV_1 | Lambda controller starting value bank 1 |
| LAM_0_2=LAMMV_MV_2 | Lambda controller starting value bank 2 |

In the case of the loading of the activated carbon filter 22, a value for the maximum loading is set, that is to say it is assumed that the activated carbon filter 22 is completely loaded (worst case assumption).

The lambda controller mean values are set as the lambda controller starting values for the lambda controllers of the two cylinder banks, whereas the remaining starting values are set to zero.

If the time since the interruption is T<K_T_TV_INT_OER (the result of the query in method step S2.2 is positive) for the opening ramp, then the following values are set in a method step S2.4:

M_F_TV_ADD_AD=M_F_TV_REL_INT*AM_KG_H

M_TVV_REL=M_TVV_REL_INT

LAM_0_1=LAM_0_1_INT

LAM_0_2=LAM_0_2_INT

In this case, the index 0 identifies the starting value, the indices 1, 2 the respective cylinder bank and the index INT the interruption procedure.

The values M_F_TV_REL_INT, M_TVV_REL_INT, LAM_0_1_INT and LAM_0_2_INT are set in the event of an interruption, that is to say the values used are those which were present at the time of the interruption and were stored. The additive correction of the injection quantity M_F_TV_ADD_AD is corrected to the air mass flow AM_KG_H.

After setting the starting values, a check is made in a method step S2.5 as to whether or not the conditions mentioned at the beginning for the opening ramp operation are satisfied. If this is the case, then in a method step S2.6 the relative mass flow M_TVV_REL through the tank venting valve 24 is increased by being incremented using a value KF_INC_TV*KF_ACF_LOAD that depends on throughput and loading:
M_TVV_REL=M_TVV_REL+KF_INC_TV*KF_ACF_LOAD
wherein
KF_INC_TV=f(AM_KG_H)
KF_ACF_LOAD=f(ACF_LOAD)

The value M_TVV_REL is the DESIRED flushing flow referred to the air mass flow AM_KG_H, and is thus a measure of the opening of the tank venting valve. The driving pulse duty factor PDF_EFF of the tank venting valve 24 is calculated from this value (see FIGS. 5 and 6). The advantage of changing the relative mass flow through the tank venting valve 24 is that, in the case of each non-steady-state operating point change, the relative fuel component from the tank venting remains approximately constant, and thus only low mixing errors occur (assumption: the change in the loading of the activated carbon filter 22 is very slow in comparison with the operating point change).

In the method step S2.6, the calculation of the degree of loading ACF_LOAD of the activated carbon filter 22 is performed in parallel with the opening of the tank venting valve 24 in the following steps:

Ascertaining the deviation DLAM_TV of the lambda controller LAM_1/2 from the starting values LAM_0_1/2 in accordance with the following relationship:

$$DLAM\_TV=-0.5*((LAM\_1-LAM\_0\_1)+(LAM\_2-LAM\_0\_2))$$

Calculating the fuel mass flow M_F_TV from the tank venting:

$$M\_F\_TV=1/K\_F\_FAC*AM\_KG\_H\_DEADT*(DLAM\_TV/100)+M\_F\_TV\_AD$$

The constant K_F_FAC takes into account the influence of the fuel and is generally to be set equal to the stoichiometric air requirement. In order to compensate for the offset in time between the acquisition of the air mass meter signal and the lambda probe signal, the air mass flow AM_KG_H is taken into account with a dead time KF_T_AM_DEADT=f(AM_KG_H) and included in the calculation as AM_KG_H_DEADT, that is to say the air mass flow is delayed and only then related to the lambda value measured by the lambda probe.

If an additive correction to the injection quantity has already been performed (FIGS. 8 and 9), the correction value M_F_TV_ADD_AD must be taken into account in the calculation of the fuel mass flow.

Figure 5:
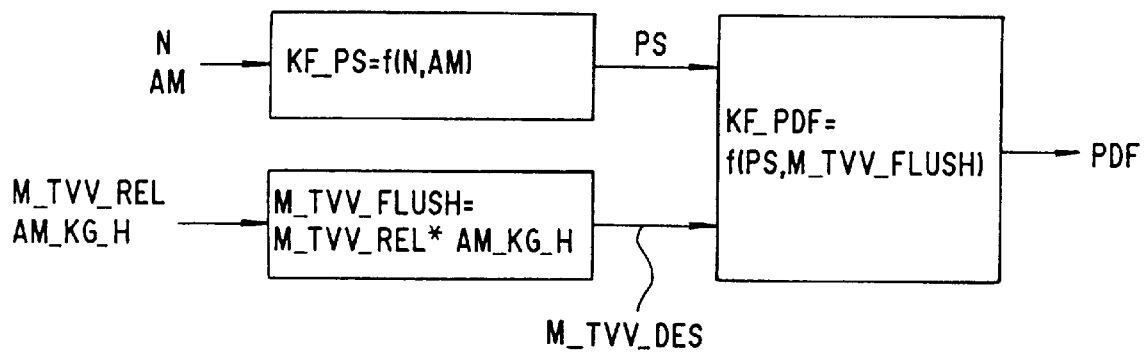
FIGS. 5 and 6 are block diagrams for calculating a driving pulse duty factor for a tank venting valve.
Figure 6:
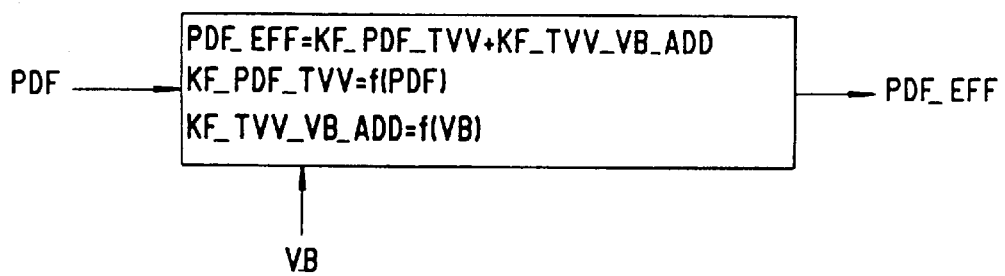
Figure 7:
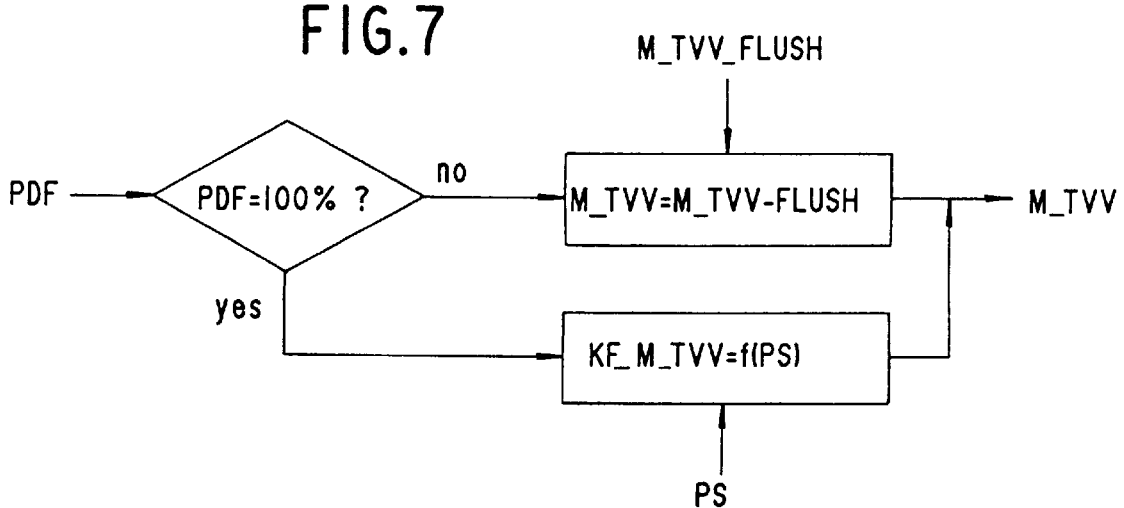
FIG. 7 is a block diagram for calculating a mass flow through the tank venting valve.

Calculating the loading ACF_LOAD of the activated carbon filter 22:
ACF_LOAD=M_F_TV/M_TVV The mass flow M_TVV through the tank venting valve 24 results from the opening of the tank venting valve and the pressure relationships at the tank venting valve (FIGS. 5-7).

The calculated loading is limited to a maximum value ACF_LOAD_MAX in order to avoid implausible values:
ACF_LOAD≦ACF_LOAD_MAX The value for ACF_LOAD_MAX lies, for example, in the range from 1.8-2.0 and depends on the fuel used for the internal combustion engine.

During the opening ramp operation, a check is made continuously as to whether or not the conditions for opening ramp operation are satisfied (method step S2.5). If the conditions are no longer satisfied, then the ramp operation is interrupted and a transition is made into MIN operation or into TVV_SHUT operation. In the event of interruption, the following values are stored in a method step S2.7:
M_F_TV_REL_INT=M_F_TV_ADD_AD/AM_KG_H_DEADT
M_TVV_REL_INT=M_TVV_REL
LAM_0_1INT=LAM_0_1
LAM_0_2INT=LAM_0_2

In the event that the time since the interruption is T<K_T_TV_INT_OER, the opening ramp operation is continued with the same relative mass flow as at the time of interruption. In this case it is assumed that the loading of the activated carbon filter only changes a little during the interruption time.

If no interruption takes place, then the tank venting valve 24 is opened until one of the following conditions is satisfied:

Tank venting valve is completely open (PDF=100%) or M_F_TV>KF_M_F_TV_MAX, with KF_M_F_TV_MAX=f(N,AM) or T_TV>K_T_TV_ST If the tank venting valve 24 is still not completely open or the fuel mass flow M_F_TV is smaller than the maximum value KF_M_F_TV_MAX that is stored in a characteristic map as a function of the rotational speed N and the air mass AM, then the tank venting valve is opened until one of the two first conditions is satisfied.

The last condition applies only in the event of first-time tank venting following the transition from the start (method step S2.8).

Figure 3A:
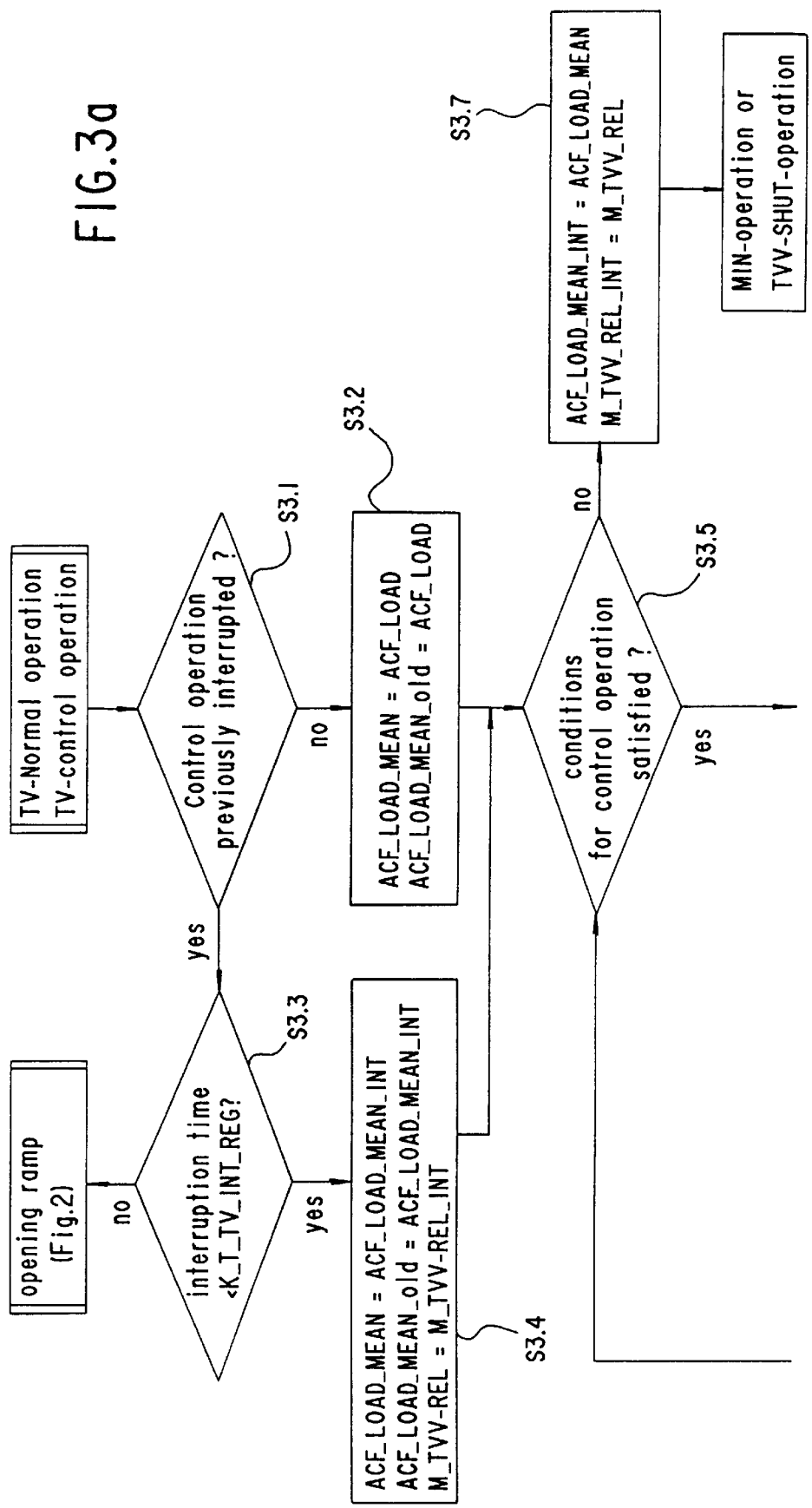
Figure 4A:
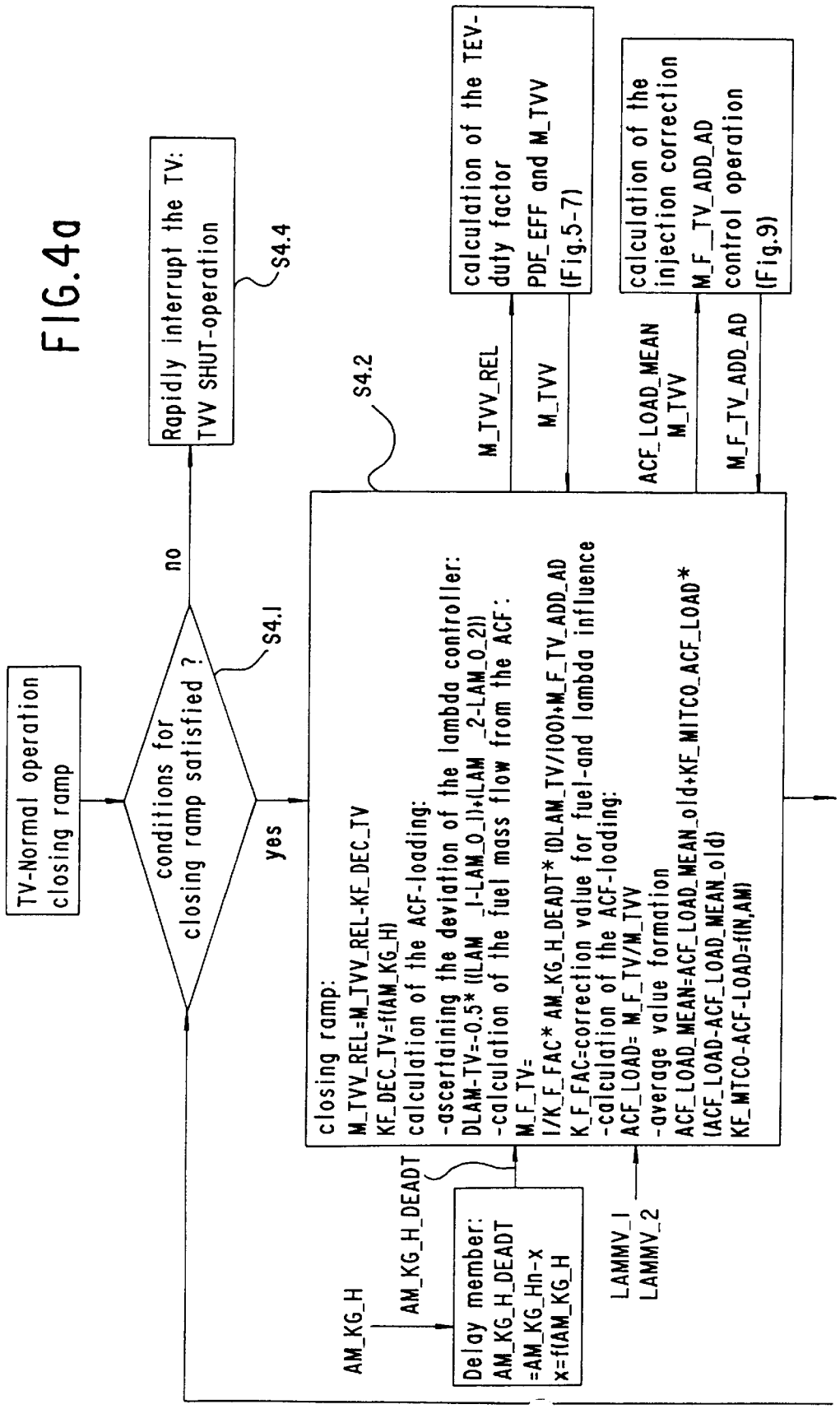
FIGS. 4a and 4b together illustrate a flow diagram for a "closing ramp operation" phase within normal operation.
Figure 4B:
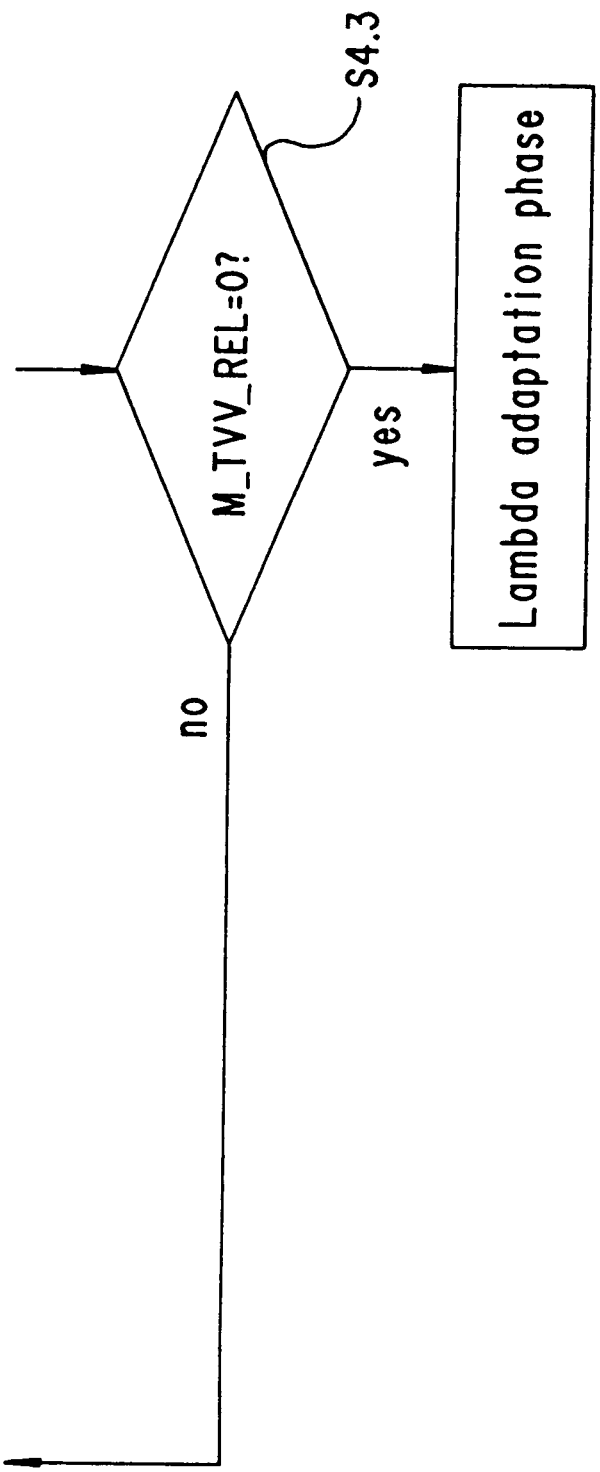

If one of the two first conditions is satisfied (query in method step S2.9), then the transition to control operation takes place (FIG. 3). If the last condition is satisfied, then the transition into the closing ramp operation takes place (FIG. 4). Before a transition is made to the closing ramp operation, the following values are set in a method step S2.10:
ACF_LOAD_MEAN_old=ACF_LOAD
ACF_LOAD_MEAN=ACF_LOAD The control operation will now be explained with reference to FIG. 3.

At the beginning of the control operation, a check is made in a method step S3.1 as to whether or not control operation has previously been interrupted. If no interruption has taken place, then the following values are set in a method step S3.2:
ACF_LOAD_MEAN=ACF_LOAD Sliding mean of the ACF loading
ACF_LOAD_MEAN_old=ACF_LOAD In this case the loading ACF_LOAD of the activated carbon filter 22 is the degree of loading that was ascertained last during opening ramp operation (method step S2.10 in FIG. 2).

If the result of the query in method step S3.1 is that the control operation has previously been interrupted, then a check is made in a method step S3.3 as to whether or not the condition T<K_T_TV_INT_REG is satisfied. If the time since the interruption of control operation is smaller than the applicable value K_T_TV_INT_REG, then in a method step S3.4 the following values are set and the control operation is continued without making a transition into opening ramp operation:
ACF_LOAD_MEAN=ACF_LOAD_MEAN_INT
ACF_LOAD_MEAN_old=ACF_LOAD_MEAN_INT
M_TVV_REL=M_TVV_REL_INT The values ACF_LOAD_MEAN_INT and M_TVV_REL_INT are set at the time of the interruption.

If it is true that T>K_T_TV_INT_REG for the time since the interruption of the control operation, then a transition is made to opening ramp operation (FIG. 2).

If the conditions mentioned at the beginning for control operation are satisfied (query in method step S3.5), then in control operation the relative mass flow through the tank venting valve 24 is set as a function of the degree of loading (method step S3.6). The calculation is carried out in accordance with the following equation:

$$M\_TVV\_REL = KF\_M\_F\_TV\_MAX/(ACF\_LOAD\_MEAN*AM\_KG\_H)$$

$$KF\_M\_F\_TV\_MAX = f(N,AM)$$

The relative mass flow through the tank venting valve is set in such a way that the fuel mass flow out of the activated carbon filter reaches an applicable maximum value KF_M_F_TV_MAX. This maximum value is stored in a characteristic map of a memory or store of the electronic engine controller 17, as a function of the rotational speed N and the air mass AM. The sliding mean of the activated carbon filter loading is set in this case in contrast with opening ramp operation.

The averaged degree of loading ACF_LOAD_MEAN of the activated carbon filter is determined in this case in the following steps:

Ascertaining the deviation DLAM_TV of the lambda controller from the starting values LAM_0_1/2. In contrast with the calculation during opening ramp operation, use is made in this case of the mean of the controller value LAMMV_1/2, in order to keep the influence of rapid changes of the lambda controller as low as possible:

$$DLAM\_TV = -0.5*((LAMMV\_1 - LAM\_0\_1) + (LAMMV\_2 - LAM\_0\_2))$$

Calculating the fuel mass flow M_F_TV out of the tank venting:

$$M\_F\_TV = 1/K\_F\_FAC * AM\_KG\_H\_DEADT * (DLAM\_TV/100) + M\_F\_TV\_ADD\_AD$$

The constant K_F_FAC takes the influence of the fuel into account and as a rule is to be set equal to the stoichiometric air requirement. In order to compensate for the offset in time (propagation time) between the air mass meter and lambda probe signal, the air mass flow AM_KG_H is taken into account with a dead time KF_T_AM_DEADT=f (AM_KG_H) and included in the calculation as AM_KG_H_DEADT.

If an additive correction of the injection quantity has already been carried out (FIG. 8), the correction value M_F_TV_ADD_AD has to be taken into account in calculating the fuel mass flow.

Calculating the loading ACF_LOAD of the activated carbon filter:

$$ACF\_LOAD = M\_F\_TV/M\_TVV$$

The calculated loading is limited to a maximum value ACF_LOAD_MAX in order to avoid implausible values:
ACF_LOAD<ACF_LOAD_MAX Since the change in the degree of loading over time is very slow as a rule, the respectively currently calculated degree of loading is filtered by forming the sliding mean:

ACF_LOAD_MEAN=ACF_LOAD_MEAN_old+KF_COCON_ACF_LOAD*(ACF_LOAD ACF_LOAD_MEAN_old)
KF_COCON_ACF_LOAD=f(N,AM)

The filter constant KF_COCON_ACF_LOAD is stored in a characteristic map as a function of the rotational speed N and the air mass AM, in order to carry out more severe filtering in characteristic map areas in which the mass flow through the tank venting valve is small (for example high load, areas in which only low values of M_F_TV_MAX are permitted). The filter constant is subject to the relationship:

$$0 < KF\_COCON\_ACF\_LOAD < 1.$$

During control operation, a check is made continuously as to whether or not the conditions for control operation are satisfied (method step S3.5). If the conditions are no longer satisfied, then control operation is interrupted and a transition is made to MIN operation or to TVV_SHUT operation. At the time of the interruption, the following values are stored (method step S3.7):
ACF_LOAD_MEAN_INT=ACF_LOAD_MEAN
M_TVV_REL_INT=M_TVV_REL If the time since the interruption is T<K_T_TV_INT_REG, control operation is continued with the same relative mass flow as at the time of interruption. In this case it is assumed that the loading of the activated carbon filter only changes a little during the interruption time.

If no interruption takes place, then control operation is carried out until one of the following conditions is satisfied (query in method step S3.8):

| | |
|---|---|
| -ACF_LOAD_MEAN<ACF_LOAD_MIN | (The activated carbon filter is empty, or falls below a minimum value) or |
| -T_TV>K_T_TV_MAX | or |
| -T_TV>K_T_TV_ST | (time overrun) |

The last condition only applies in the event of first-time tank venting following the transition from the start.

If one of the conditions is satisfied, then the transition to the closing ramp operation takes place (FIG. 4).

In the case of closing ramp operation, a check is made in a method step S4.1 as to whether or not the conditions already mentioned for this are satisfied. If no cylinder switch-off is active and the lambda controllers of the two cylinder banks are controlling unrestrictedly, the relative mass flow M_TVV_REL through the tank venting valve 24 is reduced by being decremented by a value KF_DEC_TV that depends on throughput (method step S4.2):
M_TVV_REL=M_TVV_REL KF_DEC_TV This value is stored in a characteristic map of a memory or store of the electronic control device of the internal combustion engine, as a function of the air mass AM_KG_H.
KF_DEC_TV=f(AM_KG_H)

The calculation of the mean loading of the activated carbon filter is performed in parallel with the closure of the tank venting valve in a manner analogous to the calculation in control operation (method step S3.6 in FIG. 3).

During closing ramp operation, a check is carried out continuously as to whether or not the conditions for closing ramp operation are still satisfied. If the conditions are not satisfied, then the transition is made immediately into TVV_SHUT operation, with which the tank venting is rapidly interrupted (method step S4.4).

If no interruption takes place, then in a method step S4.3 the relative mass flow through the tank venting valve is reduced until M_TVV_REL=0. This is followed by a transition to a lambda adaptation phase, that is to say when the tank venting function is not active the internal combustion engine runs in lambda control operation, and adaptation values for the lambda control are learned in a manner which is known per se.

The relative mass flow M_TVV_REL through the tank venting valve that is calculated in each partial function during normal operation (opening ramp, control operation, closing ramp) is the input variable for calculating the driving pulse duty factor for the tank venting valve. This calculation procedure is illustrated graphically in FIGS. 5 and 6. The desired flushing flow M_TVV_FLUSH is calculated from the relative mass flow M_TVV_REL:

M_TVV_FLUSH=M_TVV_REL*AM_KG_H

The driving pulse duty factor PDF of the tank venting valve results from a characteristic map KF_PDF=f(M_TVV_DES,PS), wherein PS designates the suction-pipe pressure, which is ascertained either from a characteristic map KF_PS as a function of the rotational speed N and the air mass AM:

KF_PS=f(N,AM)

or which is measured through the use of a pressure sensor or calculated with the aid of a known suction-pipe model.

The value PDF is an input variable of the characteristic curve KF_PDF_TVV, with which the characteristic curve of the tank venting valve is linearized (FIG. 6). The influence of the battery voltage VB on the mass flow through the tank venting valve is taken into account through a characteristic curve KF_TVV_VB_ADD. The effective driving pulse duty factor PDF_EFF for the tank venting valve thus results in accordance with the following equation:

PDF_EFF=KF_PDF_TVV+KF_TVV_VB_ADD

KF_PDF_TVV=f(PDF)
KF_TVV_VB_ADD=f(VB)

The effective driving pulse duty factor PDF_EFF is limited at the bottom to 0.4%, since an erroneous entry takes place in the case of driving at 0%.

In addition to calculating the driving pulse duty factor, the calculation of the mass flow M_TVV through the tank venting valve is performed. If the calculated pulse duty factor is smaller than 100%, then M_TVV=M_TVV_FLUSH (FIG. 7).

In the case of a driving pulse duty factor PDF=100%, the mass flow M_TVV results from the characteristic map KF_M_TVV=f(PS), that is to say as a function of the suction-pipe pressure, since in this case a unique assignment of M_TVV_FLUSH and M_TVV in the characteristic map KF_PDF is not possible.

The influence of the fuel mass flow M_F_TV from the flushing of the activated carbon filter must be taken into account in calculating the injection quantity, in order to avoid excessively large deviations of the air ratio. The correction is carried out through the use of an additive value M_F_TV_ADD_AD, from which an additive injection time correction is calculated. This injection time correction results from multiplying the value M_F_TV_ADD_AD for the injection quantity correction by a factor which fixes the assignment of injection quantity to injection time and, given a constant injection pressure at the injection valve, substantially depends on the structural conditions of the injection valve.

Figure 8:
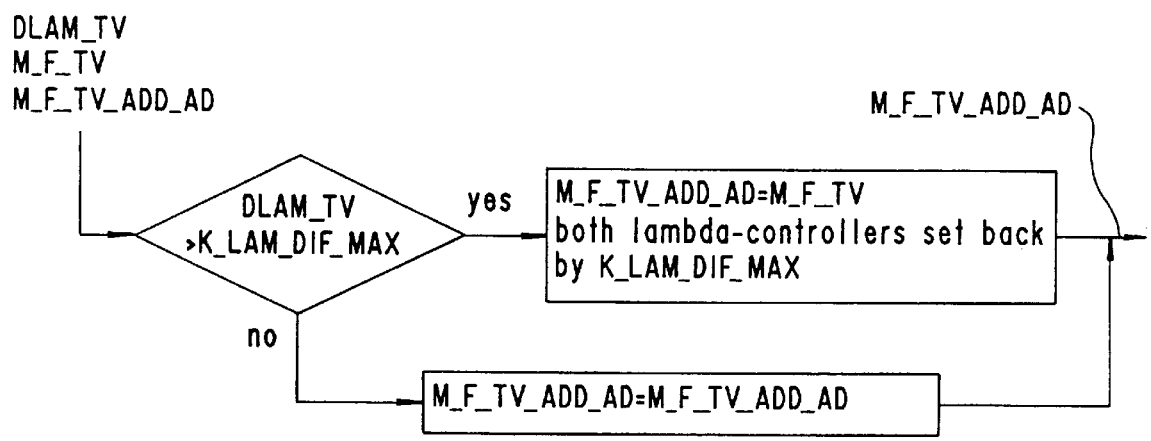
FIG. 8 is a block diagram for calculating an injection quantity correction during opening ramp operation.

FIG. 8 shows the injection quantity correction during opening ramp operation. During the opening ramp, an injection quantity correction is performed as soon as the deviation of the lambda controller DLAM_TV exceeds a value K_LAM_DIF_MAX. Each time the limiting value is exceeded, the additive injection quantity correction M_F_TV_ADD results from the currently calculated fuel mass flow M_F_TV through the tank venting valve.

The value M_F_TV_ADD in this case is included directly in the injection equation as M_F_TV_ADD_AD. At the same time, both lambda controllers are set back by a value K_LAM_DIF_MAX.

Figure 9:
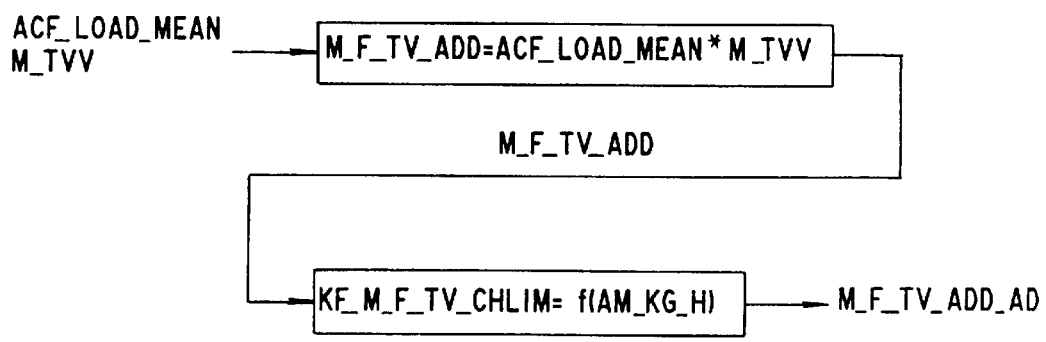
FIG. 9 is a block diagram for calculating the injection quantity correction during control operation.

The injection quantity correction during control operation and closing ramp operation is illustrated in FIG. 9. In this case, the additive correction of the fuel mass flow M_F_TV_ADD results from the mean degree of loading of the activated carbon filter ACF_LOAD_MEAN and the current mass flow M_TVV through the tank venting valve:

M_F_TV_ADD=ACF_LOAD_MEAN*M_TVV

This value is calculated continuously during an entire control operation. A change limitation KF_M_F_TV_CHLIM=f(AM_KG_H) applies to all changes in M_F_TV_ADD. This results in the value M_F_TV_ADD_AD, from which the additive injection quantity correction and from this in turn the additive injection time correction, are calculated.

The lambda adaptation is blocked during the tank venting phase, that is to say while one of the time slices K_T_TV_ST or T_TV is elapsing.

The lambda adaptation runs during the time slice K_T_TI_AD. The adaptation is enabled as soon as the pulse duty factor PDF=0.

The adaptation values are recorded at the time of the transition from the lambda adaptation phase to the tank venting phase. These values continue to be included in the calculation of the injection time equation during the tank venting phase, and are set as starting values when the lambda adaptation is restarted.

FIG. 10 shows the sequence of the tank venting function during normal operation at a steady-state operating point, in the form of a timing diagram. The time profiles of the following variables are illustrated:

| | |
|---|---|
| M_TVV_REL | Mass flow through the tank venting valve, related to the air mass AM_KG_H (FIG. 10a) |
| PDF_EFF | Effective driving pulse duty factor of the tank venting valve (FIG. 10b) |
| DLAM_TV | Mean deviation of the lambda controller (FIG. 10c) |
| ACF_LOAD | Degree of loading of the activated carbon filter (FIG. 10d) |
| ACF_LOAD_MEAN | Averaged degree of loading of the activated carbon filter (FIG. 10d) |
| M_F_TV | Calculated fuel mass flow through the tank venting valve (FIG. 10e) |
| M_F_TV_ADD_AD | Effective additive correction of the injection quantity (FIG. 10e) |

In addition, the time regions running one after another following the starting of the internal combustion engine are drawn in FIG. 10f.

The normal operation starts with the opening ramp operation. In this case, the relative mass flow through the tank venting valve M_TVV_REL is increased incrementally. The level of the increments depends on the air mass flow AM_KG_H, which is ascertained through the use of the air mass flow meter, as well as on the loading ACF_LOAD of the activated carbon filter. The relative mass flow through the tank venting valve M_TVV_REL is used to calculate the effective driving pulse duty factor PDF_EFF for the tank venting valve, which determines the actual opening of the tank venting valve.

During the opening of the tank venting valve, the fuel mass flow M_F_TV out of the tank venting, and the degree of loading ACF_LOAD of the activated carbon filter are calculated from the mean deviation of the lambda controller DLAM_TV and the additive correction M_F_TV_ADD_AD.

If the mean lambda controller deviation DLAM_TV exceeds a limiting valve K_LAM_DIF_MAX during the opening ramp, then the injection quantity is corrected additively by the current value M_F_ADD_AD=M_F_TV, and at the same time the lambda controller values are in each case offset by the value K_LAM_DIF_MAX (time t1 in FIG. 10c and FIG. 10e).

The relative mass flow through the tank venting valve M_TVV_REL is increased until the fuel mass flow M_F_TV exceeds a limiting value KF_M_F_TV_MAX. The opening ramp operating region is then completed, and a transition is made to control operation (time t2, FIG. 10e).

In control operation, as in the opening ramp operating region, the fuel mass flow M_F_TV out of the tank venting, and the degree of loading ACF_LOAD of the activated carbon filter, are calculated from the mean lambda controller deviation DLAM_TV and the current additive injection quantity correction M_F_TV_ADD_AD. The mean degree of loading ACF_LOAD_MEAN is calculated from the currently calculated degree of loading ACF_LOAD by forming a sliding average (FIG. 10d).

The relative mass flow through the tank venting valve M_TVV_REL, and therefore the pulse duty factor PDF_EFF, are calculated in control operation as a function of the maximum permissible fuel mass flow KF_M_F_TV_MAX and the mean degree of loading ACF_LOAD_MEAN. This results in an increase in the pulse duty factor PDF_EFF that depends on the degree of loading. The opening of the tank venting valve is set in such a way that the fuel mass flow out of the tank venting M_F_TV is equal to a characteristic map value KF_M_F_TV_MAX. The mass flow M_TVV through the tank venting valve can be increased until the tank venting valve is completely open (PDF_EFF=100%, time t3). From this time on, the mass flow through the tank venting valve can no longer be adapted, that is to say the desired flushing flow M_TVV_FLUSH is greater than the effective flushing flow M_TVV.

During control operation, the injection quantity is continuously corrected by the additive value M_F_TV_ADD_AD. This value is ascertained in control operation as a function of the mean loading of the activated carbon filter ACF_LOAD_MEAN and the effective mass flow through the tank venting valve, and represents a value for the mean fuel mass flow through the tank venting valve. As a result of the additive correction of the injection quantity, the deviation of the lambda controller is completely compensated, that is to say DLAM_TV=0(FIG. 10c).

Control operation is ended as soon as the mean loading of the activated carbon filter ACF_LOAD_MEAN falls below a threshold value K_ACF_LOAD_MIN (FIG. 10d, time t4). This is followed by the closing ramp operating region.

During the closing ramp operating region, the relative mass flow M_TVV_REL is reduced decrementally until it exhibits the value 0. The calculation of the fuel mass flow M_F_TVV through the tank venting valve, of the degree of loading ACF_LOAD of the activated carbon filter and of the additive correction of the injection quantity M_F_TV_ADD_AD is performed in a manner analogous to the calculation in control operation.

I claim:

1. A method for tank venting in an internal combustion engine having a lambda control device for controlling an air/fuel mixture to be fed to the internal combustion engine, the method which comprises:
   intermediately storing fuel vapors arising from a fuel supply container in an adsorption container having an activated carbon filter;
   loading the activated carbon filter to a degree dependent on a mass of adsorbed fuel vapors;
   initiating a flushing procedure of the activated carbon filter within the context of a regeneration phase, in selected operating regions of the internal combustion engine;
   continuously varying a passage cross section of a tank venting valve connected between the adsorption container and the internal combustion engine, driving the tank venting valve with an electrical signal having a variable pulse duty factor, introducing a flushing stream into an intake tract of the internal combustion engine downstream of a throttle and feeding the flushing stream for combustion;
   ascertaining the degree of loading of the activated carbon filter and calculating a desired flushing flow in dependence on a level of the degree of loading and a predefined value for a maximum possible fuel mass flow through the tank venting valve; and
   setting a pulse duty factor for the tank venting valve as a function of the desired flushing flow, a temperature of a flushing stream and a pressure gradient at the tank venting valve, for preventing a lambda deviation brought about by a flushing procedure, of a lambda controller of the lambda control device, from exceeding a predefined maximum value.

2. The method according to claim 1, which comprises calculating the degree of loading ACF_LOAD of the activated carbon filter from the air mass flow M_A_TV through the activated carbon filter, the air mass flow M_A_ENG through the throttle and the relative deviation of the lambda controller LAM_TV due to the tank venting, in accordance with the following relationship:

$$ACF\_LOAD = \frac{M\_A\_TV + M\_A\_ENG*(LAM\_TV)}{M\_A\_TV*(1+A_{ST}) + M\_A\_ENG*(LAM\_TV)}$$

wherein $A_{st}$ is the stoichiometric air requirement.

3. The method according to claim 2, which comprises measuring the air mass flow through the activated carbon filter with an air mass flow meter disposed at an aeration line of the activated carbon container, and measuring the air mass flow through the throttle with an air mass flow meter disposed in the intake tract of the internal combustion engine.

4. The method according to claim 1, which comprises calculating the degree of loading ACF_LOAD of the activated carbon filter in accordance with the following relationship:

$$ACF\_LOAD = \frac{M\_A\_ENG*LAM\_TV}{A_{ST}*M\_TVV}$$

wherein:
   M_A_ENG is the air mass flow through the throttle;
   LAM_TV is the relative deviation of the lambda controller;
   $A_{st}$ is the stoichiometric air requirement; and
   M_TVV is the mass flow through the tank venting valve in the case of an unloaded activated carbon filter; and
fixing the values for the mass flow as a function of pressure relationships at the tank venting valve, air temperature in the intake tract and opening of the tank venting valve.

5. The method according to claim 1, which comprises calculating the desired flushing flow M_TVV_FLUSH through the tank venting valve in accordance with the following relationship:

$$M\_TVV\_FLUSH = \frac{M\_F\_TV\_MAX}{ACF\_LOAD}$$

wherein:
 ACF_LOAD is the degree of loading of the activated carbon filter; and
 M_F_TV_MAX is the maximum permissible fuel mass flow through the tank venting valve.

6. The method according to claim 1, which comprises ascertaining an effective pulse duty factor from the pulse duty factor, performing a correction taking a battery voltage of a vehicle driven by the internal combustion engine into account, and performing a correction taking a nonlinearity of the characteristic curve of the tank venting valve into account.

7. The method according to claim 1, which comprises calculating a relative mass flow M_TVV_REL through the tank venting valve from the desired flushing flow M_TVV_FLUSH in accordance with the following equation:

$$M\_TVV\_REL = M\_TVV\_FLUSH/AM\_KG\_H$$

wherein AM_KG_H is the air mass flow.

8. The method according to claim 7, which comprises dividing a tank venting procedure into a plurality of phases running sequentially in time as follows:
 incrementally increasing the relative mass flow in an opening ramp operation starting from a value zero until the fuel mass flow exceeds a limiting value;
 then calculating the relative mass flow in a control operation as a function of a maximum permissible fuel mass flow and a mean degree of loading; and
 decrementally reducing the relative mass flow in a closing ramp operation as far as the value zero.

9. The method according to claim 8, which comprises ascertaining the mean lambda controller deviation of the lambda controller during the opening ramp operation from predefined starting values, and additively correcting an injection quantity of fuel to be fed to the cylinders of the internal combustion engine by a value if the mean lambda controller deviation exceeds a limiting value and the injection quantity correction corresponds to the currently calculated fuel mass flow.

10. The method according to claim 8, which comprises calculating the fuel mass flow out of the tank venting and the degree of loading from the mean lambda controller deviation and the additive correction, during the opening ramp operation.

11. The method according to claim 10, which comprises calculating the fuel mass flow M_F_TV in accordance with the relationship:

$$M\_F\_TV = 1/K\_F\_FAC*AM\_KG\_H\_DEADT*(DLAM\_TV/100) + M\_F\_TV\_ADD\_AD$$

wherein:
 K_F_FAC is a constant taking the influence of the fuel into account;
 AM_KG_H_DEADT is a factor taking a compensation for an offset in time between the acquisition of the air mass flow meter signal and of the lambda probe signal into account;
 DLAM_TV is the mean lambda controller deviation; and
 M_F_TV_ADD_AD is the additive correction.

12. The method according to claim 10, which comprises calculating the degree of loading ACF_LOAD in accordance with the relationship:

$$ACF\_LOAD = M\_F\_TV/M\_TVV$$

wherein:
 M_F_TV is the fuel mass flow; and
 M_TVV is the mass flow through the tank venting valve.

13. The method according to claim 12, which comprises limiting the value for the degree of loading to a maximum value in order to avoid implausible values.

14. The method according to claim 8, which comprises carrying out the control operation until the mean degree of loading falls below a predefined threshold value.

15. The method according to claim 8, which comprises carrying out the control operation until a time since a starting of a tank venting procedure exceeds a predefined value.

16. The method according to claim 8, which comprises making an additive correction M_F_TV_ADD_AD to the fuel injection quantity during control operation and during the closing ramp operation, and forming the correction from the averaged degree of loading ACF_LOAD_MEAN and the current mass flow M_TVV through the tank venting valve as follows:

$$M\_F\_TV\_ADD\_AD = ACF\_LOAD\_MEAN*M\_TVV.$$

* * * * *